UNITED STATES PATENT OFFICE.

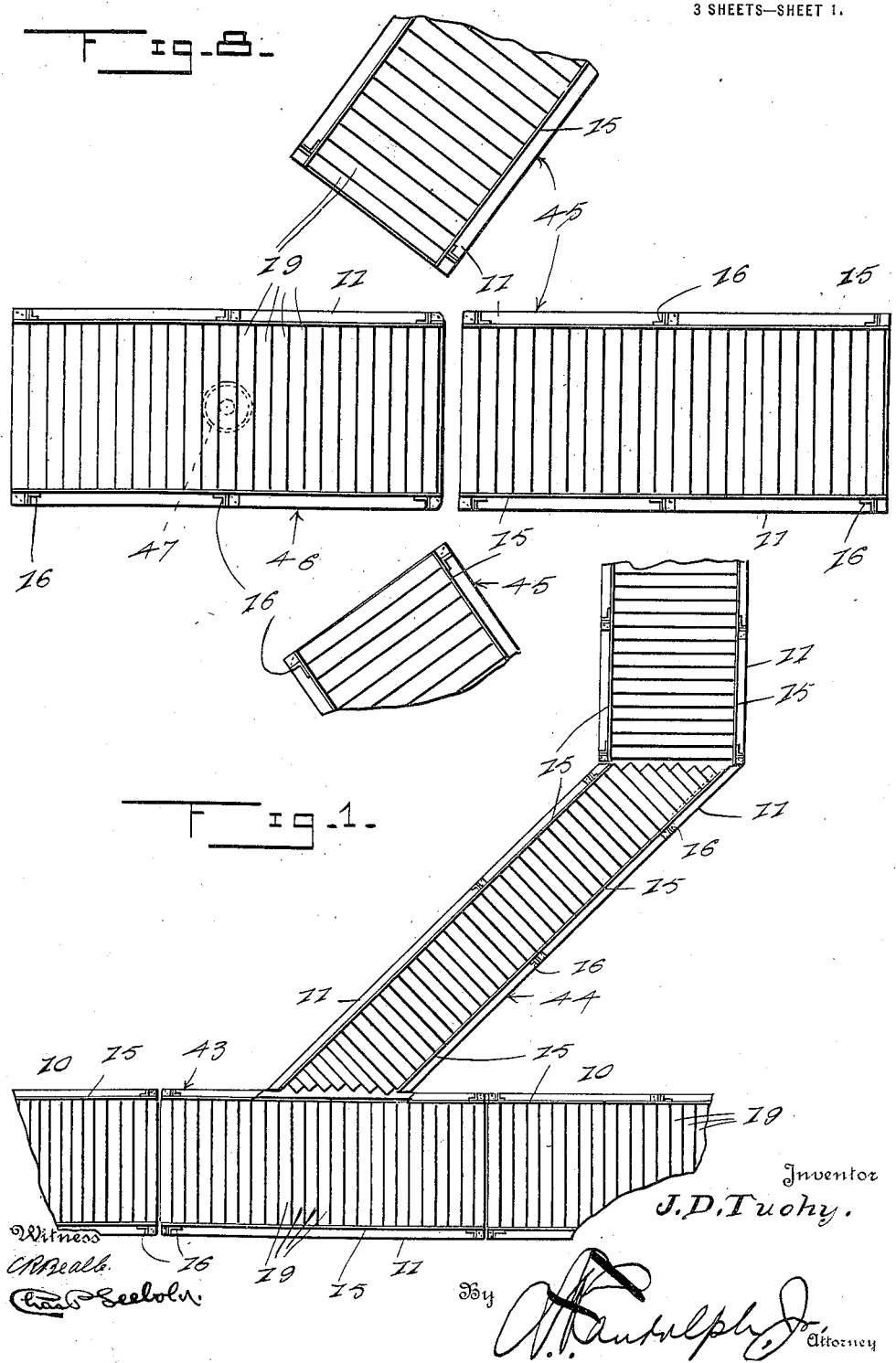

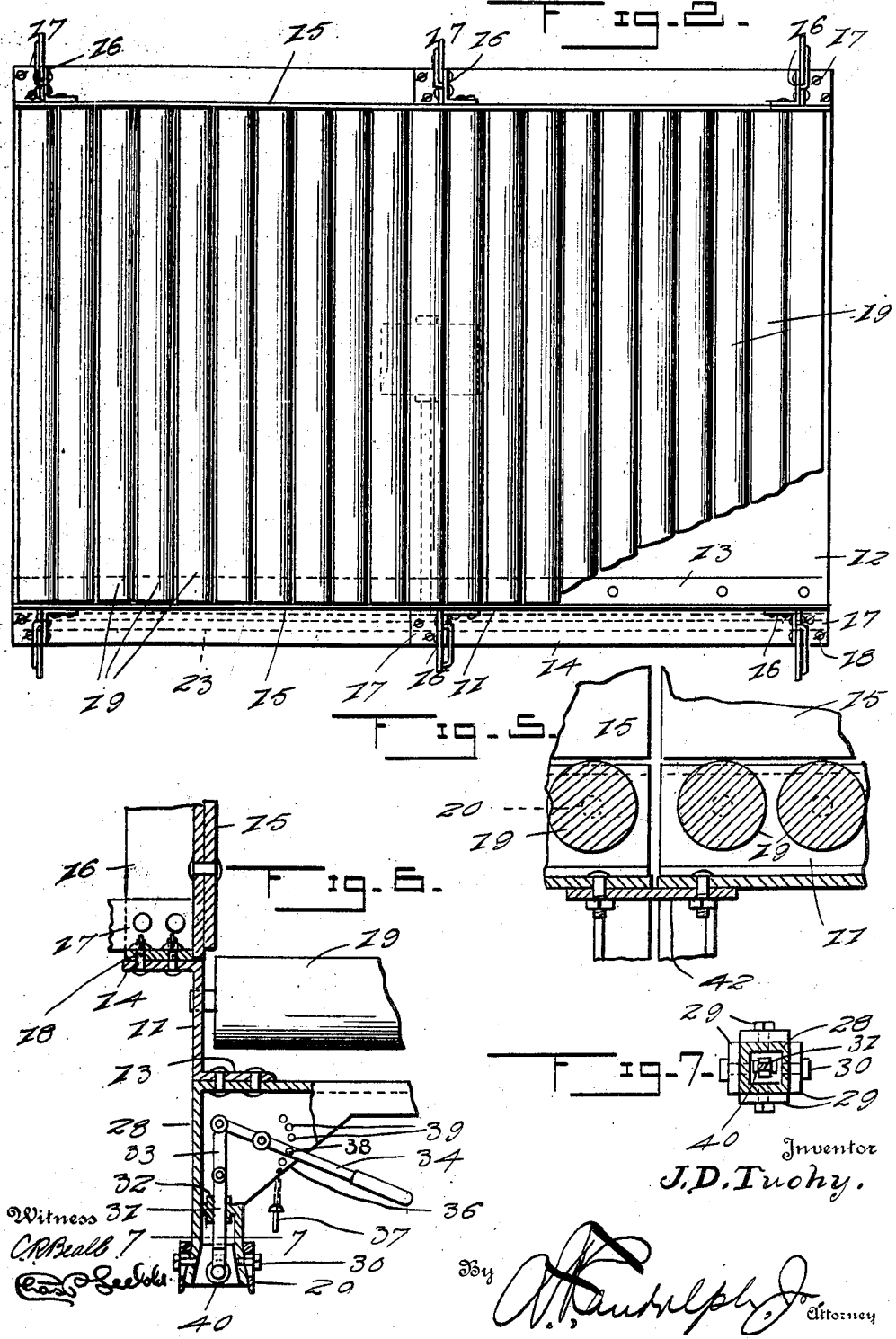

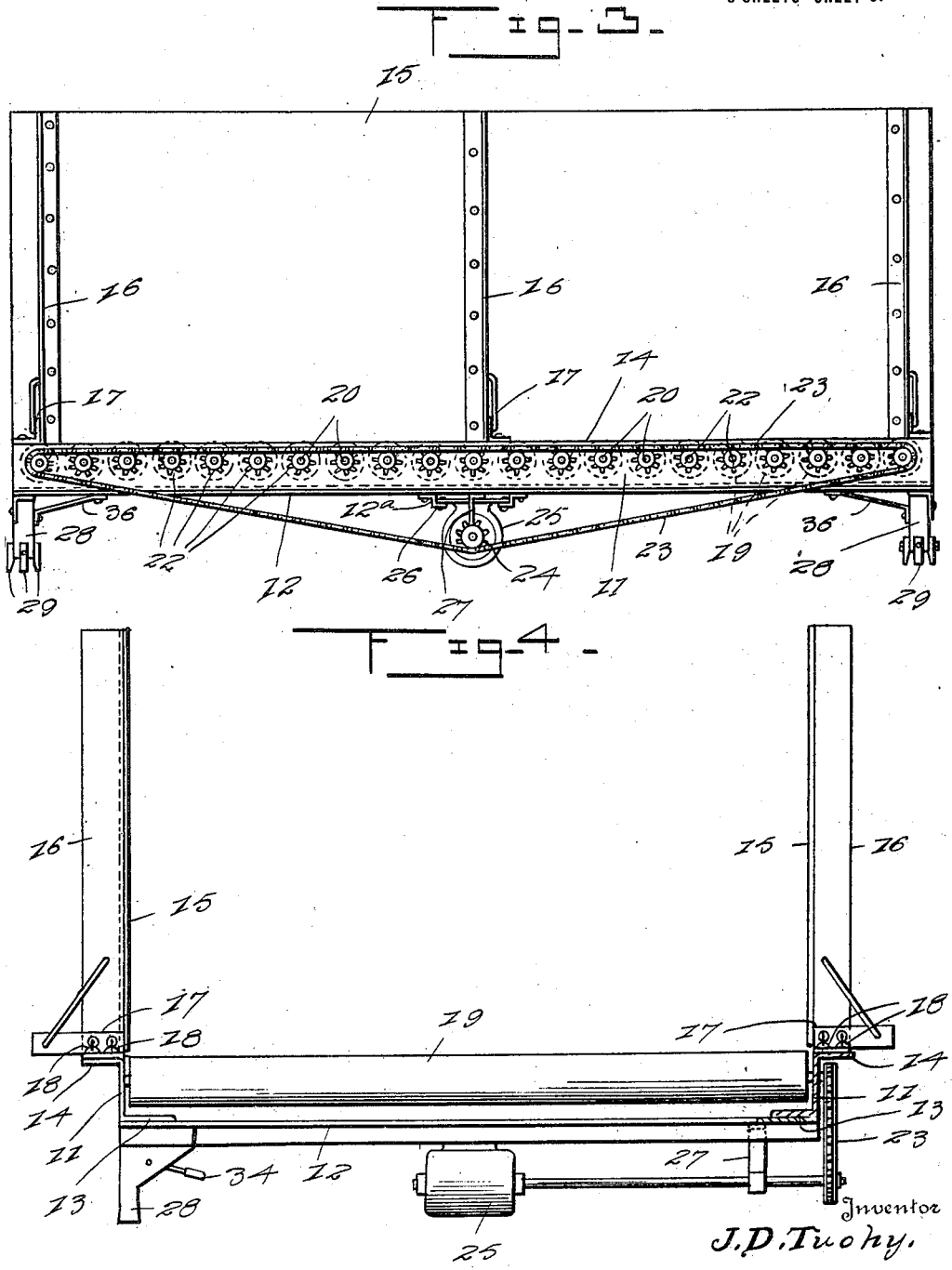

JAMES D. TUOHY, OF OAK PARK, ILLINOIS.

PORTABLE SECTIONAL CONVEYER.

1,380,691.                Specification of Letters Patent.    Patented June 7, 1921.

Application filed August 11, 1916. Serial No. 114,442.

*To all whom it may concern:*

Be it known that I, JAMES D. TUOHY, a citizen of the United States, residing at Oak Park, in the county of Cook and State of Illinois, have invented certain new and useful Improvements in Portable Sectional Conveyers; and I do hereby declare the following to be a full, clear, and exact description of the invention, such as will enable others skilled in the art to which it appertains to make and use the same.

This invention relates to improvements in conveying apparatus and has for its primary object to provide a conveyer of the portable type including a plurality of separable and interchangeable sections, each section being equipped with motive power whereby the conveying rollers are operated.

With this and other objects in view, the invention consists in the novel construction, combination and arrangement of parts as will be hereinafter specifically described, claimed and illustrated in the accompanying drawing, in which:

Figure 1 represents a plan view of a conveying apparatus partly broken away,

Fig. 2 represents a plan view of one of the sections of the conveyer, partly broken away, Fig. 3 represents a side elevation of the section, Fig. 4 represents an end elevation, of the section, partly in section, Fig. 5 represents an enlarged detail sectional view through the adjacent ends of two contiguous sections, Fig. 6 represents a detail sectional view through a portion of one of the conveyer sections, illustrating the leg in detail.

Fig. 7 represents a horizontal sectional view on the line 7—7 of Fig. 6,

Fig. 8 represents a plan view of the modification of the arrangement of the sections of the conveying apparatus.

Referring to the drawing in detail, wherein similar reference numerals designate corresponding parts throughout the several views, the conveyer apparatus consists in a plurality of similar separable sections designated, respectively, by the numerals 10 and each section includes a substantially rectangular frame comprising side or longitudinal members 11 and transverse connecting members 12, preferably constructed of angle iron, which are rigidly secured at their opposite terminals to the inwardly directed flanges 13 of the side members 11. The upper edges of the side members 11 are turned outwardly to present horizontally disposed flanges 14, upon which are supported the removable sides 15, carrying vertical reinforcing members 16 to which are attached L-shaped plates 17. The reinforcing members 16 are removably secured to the flanges 14 by removable thumb screws 18.

A plurality of conveying rollers 19 having rigid axially projecting trunnions 20 are rotatably mounted in the vertical portions of the side members 11 and project slightly above the top surfaces of the flanges 14. The trunnions at one side of the frame are extended a distance laterally of the adjacent side members 11 and support sprocket wheels 22 over which is trained the upper horizontal portion of the sprocket chain 23, which latter extends downwardly from the sprocket wheels 22 at the ends of the frame and then under a sprocket wheel 24 rigidly secured upon the drive shaft of an electric motor 25.

The intermediate connecting members 12$^a$ of the frame are provided with inwardly directed flanges 26 upon which is supported the base of the motor 25, and the shaft of said motor is supported in an auxiliary bearing member 27 depending from one of the side members 11.

The frame of each section 10 is supported at each of its four corners upon a leg 28. The legs 28 are preferably of hollow construction and are provided at their lower terminals with a plurality of substantially wedge shaped supporting members 29, having the relatively sharp edges directed downwardly and adapted to engage the floor or other object upon which the conveyer is supported to prevent lateral or sliding movement thereof. The wedges or supporting members 29 are secured in adjusted position by bolts 30.

A vertically movable rod 31 is slidably mounted in a guide 32 arranged in each leg 28 and is connected at its upper terminal by a link 33 with one end of a hand lever 34, which latter is pivotally secured at 35 to the laterally projecting portion 36 of the leg and is adapted to be secured in adjusted position by a pin 37, adapted for insertion through an aperture 38 in the lever and in any one of a plurality of apertures 39 formed in the inwardly directed portion 36 of the leg. The lower terminal of the rod 31 rotatably supports a roller 40 adapted, when the rod 31 is moved downwardly by the lever 34 to project below the supporting members 29 and thus support the conveyer section upon the rollers 40, in such manner that it may be conveniently moved from place to place. It will be understood that the lever 34 is locked in adjusted position by inserting the pin 37 through the aperture 38 therein and any one of the several apertures 39 in the inwardly directed portion 36 of the leg.

Several of the conveyer sections are assembled in line with each other for conveying freight, or other articles, from one point to another by coupling plates 42 connecting the transverse frame members 12 of the adjacent sections. If desired, the main line of conveyer sections, which is indicated in Fig. 1 by the numeral 43, may be connected with a branch line, designated by the numeral 44 for conveying certain articles to a point removed from the terminal of the main line 43. In operation, the rollers of each section are driven from the electric motor 25 by the chain 23, which extends over the several sprocket wheels 22 carried by the roller trunnions 20, and the articles supported upon the rollers are prevented from moving laterally therefrom by the vertical side members 15.

In instances where articles are to be conveyed to numerous points a plurality of conveyer lines 45 may be utilized and the articles to be conveyed are carried to any one of the several lines 45 by a relatively movable conveyer section 46, which is pivotally supported at 47, and may be swung upon its pivotal axis into line with any one of the several conveyer lines 45.

What I claim is:

1. A conveyer comprising a plurality of frames arranged in endwise relation, means for detachably securing the frames together, rollers journaled to each of the frames and having one of their ends projecting beyond one of the sides of the frames, sprocket wheels secured to said ends of the rollers, a sprocket chain trained over the sprocket wheels of the frames, a motor secured to the under side of the frames, and sprocket wheels secured to the motors and engaging the sprocket chains.

2. A conveyer comprising a rectangular frame including longitudinal and transverse members constructed from angle iron, flanges secured to the ends of said members for firmly connecting them together, vertical side members formed on said flanges and extending parallel with the longitudinal members, outwardly directed horizontal flanges formed on the upper edges of said members, rollers journaled to the side members and projecting slightly above the upper edges thereof, means for rotating said rollers, vertical reinforcing members detachably secured to the horizontal flanges, and sides secured to the reinforcing members.

In testimony whereof I affix my signature in presence of two witnesses.

JAMES D. TUOHY.

Witnesses:
L. TUOHY,
R. TUOHY.